(12) United States Patent
Goldstein (10) Patent No.: US 8,975,771 B2
(45) Date of Patent: Mar. 10, 2015

(54) WIND POWER DEVICE WITH DYNAMIC SAIL, STREAMLINED CABLE OR ENHANCED GROUND MECHANISM

(71) Applicant: Leonid Goldstein, Austin, TX (US)

(72) Inventor: Leonid Goldstein, Austin, TX (US)

(*) Notice: Subject to any disclaimer, the term of this patent is extended or adjusted under 35 U.S.C. 154(b) by 0 days.

(21) Appl. No.: 14/266,765

(22) Filed: Apr. 30, 2014

(65) Prior Publication Data
US 2014/0232114 A1 Aug. 21, 2014

Related U.S. Application Data (63) Continuation of application No. PCT/US2012/067143, filed on Nov. 29, 2012.

(60) Provisional application No. 61/566,681, filed on Dec. 4, 2011, provisional application No. 61/577,329, filed on Dec. 19, 2011, provisional application No. 61/621,535, filed on Apr. 8, 2012, provisional application No. 61/621,593, filed on Apr. 9, 2012, provisional application No. 61/624,470, filed on Apr. 16, 2012, provisional application No. 61/662,476, filed on Jun. 21, 2012.

(51) Int. Cl.
*F03D 9/00* (2006.01)
*F03D 7/00* (2006.01)
*B64C 31/06* (2006.01)

(52) U.S. Cl.
CPC . *B64C 31/06* (2013.01); *F03D 7/00* (2013.01); *F03D 9/002* (2013.01)
USPC .......................................................... 290/55

(58) Field of Classification Search
CPC ...... F03D 5/00; Y02E 10/70; F05B 2240/921
USPC .................................. 290/44, 55; 244/153 R
See application file for complete search history.

(56) References Cited

U.S. PATENT DOCUMENTS

| 4,033,279 | A | 7/1977 | Stiles |
| 7,188,808 | B1* | 3/2007 | Olson ....................... 244/153 R |
| 7,504,741 | B2* | 3/2009 | Wrage et al. ..................... 290/55 |
| 7,656,053 | B2* | 2/2010 | Griffith et al. .................. 290/44 |
| 7,672,761 | B2 | 3/2010 | Wrage |
| 8,080,889 | B2 | 12/2011 | Ippolito |
| 8,113,777 | B2* | 2/2012 | Vergnano ........................ 416/41 |
| 8,247,912 | B2* | 8/2012 | Da Costa Duarte Pardal et al. ............................... 290/44 |
| 8,421,257 | B2 | 4/2013 | Chernyshov |
| 2002/0040948 | A1* | 4/2002 | Ragner ..................... 244/153 R |
| 2007/0120004 | A1 | 5/2007 | Olson |

(Continued)

FOREIGN PATENT DOCUMENTS

RU 29281 U1 5/2003

OTHER PUBLICATIONS

Diehl, Moritz; Windenergienutzung mit schnell fliegenden Flugdrachen; TU Muenchen, Ringvorlesung Umwelt, Jan. 20, 2010 (in English).

*Primary Examiner* — Tho D Ta (57) ABSTRACT

An improved wind power device for wind energy conversion or vehicle propulsion. Among many possibilities contemplated, the device may have a moving sail with tethered wings (101), moving in elliptical trajectory, utilize separate sheave (503) and cable drum (505), use a block and tackle (411), attached to the tether and utilize a cable having a flexible jacket with aerodynamically streamlined cross section (603).

14 Claims, 8 Drawing Sheets

(56) References Cited

U.S. PATENT DOCUMENTS

| | | |
|---|---|---|
| 2009/0212574 A1 | 8/2009 | Wrage |
| 2009/0289148 A1 | 11/2009 | Griffith |
| 2011/0041747 A1 | 2/2011 | Reusch |
| 2012/0086210 A1 * | 4/2012 | Gray ............................. 290/55 |

* cited by examiner

WIND POWER DEVICE WITH DYNAMIC SAIL, STREAMLINED CABLE OR ENHANCED GROUND MECHANISM

CROSS REFERENCE TO RELATED APPLICATIONS

This Application is a continuation of PCT Application No. PCT/US12/67143, filed 29 Nov. 2012, which claims the benefit of U.S. Provisional Application No. 61/566,681, filed 4 Dec. 2011, No. 61/577,329, filed 19 Dec. 2011, No. 61/621,535, filed 8 Apr. 2012, No. 61/621,593, filed 9 Apr. 2012, No. 61/624,470, filed 16 Apr. 2012, No. 61/662,476, filed 21 Jun. 2012 by the same inventor as herein, the entire disclosure of which is incorporated herein by reference.

BACKGROUND OF THE INVENTION

This invention is generally directed to wind power utilizing systems and methods, using airborne wings or sails.

Recently, a novel approach to wind power utilization has appeared. A computer controlled kite, flying crosswind, harnesses power of the wind, which is further converted into electric energy or into propulsion of a ship. One example of former is U.S. Pat. No. 8,080,889 by Ippolito et al (assigned to KiteGen). One example of later is U.S. Pat. No. 7,672,761 by Wrage (assigned to SkySails). The common part is that the kite moves cross wind with high speed in so-called 'figure 8' trajectory. The tether of the kite also moves crosswind and experiences very large drag, which can exceed the drag of the kite itself. This drag wastes energy and limits possible length of the tether.

The crosswind flying airborne wing develops high lift forces. In the electricity generating applications, the speed of the tether, transferring this lift to the rotor of the electric generator, is relatively low (typically about ⅓ of the wind speed), resulting in relatively low power output for the force. This issue is further exacerbated by unwinding the tether from a tether drum, and using the same drum as a rotational element, converting linear motion of the cable into rotational motion. The drum is wide, and its width further increases when the tether's thickness increases. Consequently, drum's RPM is low and it requires an expensive gearbox with high input torque and large conversion ratio in order to achieve 1,500-1,800 RPM, required by most conventional electric generators.

One attempt to solve the problem of high cable drag is U.S. patent application Ser. No. 12/154,685 Faired Tether for Wind Power Generation Systems by Griffith et al. Unfortunately, the tether in that application is prohibitively expensive or inefficient.

This invention is directed to solving these problems and more.

SUMMARY OF THE INVENTION

One embodiment of the invention is a moving sail for use in systems, utilizing wind power, comprising at least two airborne wings; a platform at the ground level; a pulled element attached to the platform; a tether, connecting the wings to the pulled element; an anti-twist device, preventing twisting of the tether by motion of the wings; and the wings move under influence of the wind in the same clockwise or counter clockwise direction, if viewed from the platform, and the motion of the wings has substantial cross wind component. Another embodiment of the invention is a moving sail for use in systems, utilizing wind power, comprising two or more two airborne wings; a platform at the ground level with a pulled element attached to it; an airborne attachment device, having two sides, allowed to freely rotate one relative to another; each wings is attached to one side of the attachment device by a flexible cable; and a tether, attached to another side of the attachment device and to a pulled element of said platform; the wings move under influence of the wind in the same clockwise or counter clockwise direction, if viewed from the platform, and the motion of the wings has substantial cross wind component.

Related method of utilizing wind power, comprising steps of providing at least two airborne wings, attached to a tether by cables; providing a platform having an element, pulled by the tether at the ground level and controlling the wings to move at least partially cross wind, in the same clockwise or counter clockwise direction relative to the platform for multiple loops, while preventing twisting of the tether.

Another aspect of the invention is a device for conversion of wind energy into electric energy, comprising an airborne wing or sail, moving under power of wind; a cable, attached to this wing or sail; a block and tackle system, attached to the cable; a ground level platform with a rotational element (like a sheave, a pulley or a sprocket) on it, coupled to the block and tackle system and an electric generator with a rotor rotationally connected to the rotational element.

Another aspect of the invention is a device for conversion of wind energy into electric energy, comprising an airborne wing or sail, moving under power of wind; a cable, attached to this wing or sail; a ground level platform with a rotational element (like a sheave, a pulley or a sprocket) in contact with the cable; an electrical generator, having a rotor rotationally connected to the rotational element; and means for holding excess of said cable (like a cable drum). The cable may comprise two dissimilar sections, a top section and a bottom section, and only the bottom section is exposed to said rotational element.

Related method of converting linear motion of a cable into rotational motion in a wind energy conversion device, comprising steps of providing an airborne wing; a cable, coupled to the airborne wing; a rotational element coupled with a rotor of an electric generator; coupling the cable with the rotational element; storing excess of the cable separately from the rotational element. Further, the top part of the cable, which normally does not come in contact with the rotational element, may have round or streamlined section; and the bottom part of the cable, which does come in contact with the rotational element, may have flat or flattened section. An electronic control system may be utilized to control the electrical generator and/or the rotational element and/or to synchronize reel on/reel off of said cable with the motion of the airborne wing.

Another aspect of the invention is a cable with aerodynamically streamlined profile, comprising a load bearing core and a flexible jacket having aerodynamically streamlined profile around the core, placed in such way that the center of aerodynamic pressure on the jacket is behind the center of the core, when the profile of the cable is not oriented straight into the relative airflow.

A method of manufacturing a cable with aerodynamically streamlined profile, comprising steps of providing at least one core cable made of a material with high tensile strength and wrapping a flexible jacket, having aerodynamically streamlined profile, around it.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

The accompanying drawings illustrate the invention. The illustrations omit details not necessary for understanding of the invention, or obvious to one skilled in the art, and show parts out of proportion for clarity. In such drawings.

DETAILED DESCRIPTION OF THE PREFERRED EMBODIMENTS

Unless stated otherwise, term "cable" here includes usual mechanical cables, ropes and lines of any form and material. It also encompasses belts, including perforated belts, flat belts, round belts, toothed belts, ribbed belts, grooved belts and V-belts. A tether is a kind of a cable, lower end of which is attached to an object on the ground level.

Figure 1:
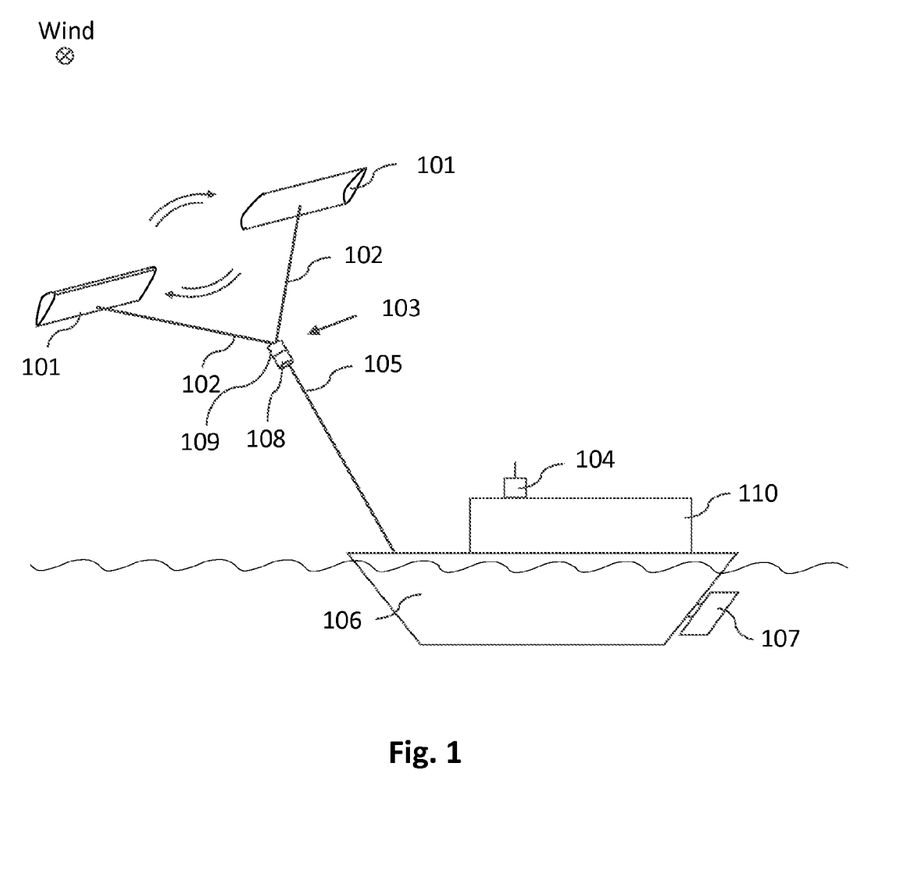
FIG. 1 is a schematic view of a vehicle propulsion system with a dynamic sail according to one aspect of the present invention

FIG. 1 shows one embodiment of the invention, in which a system of airborne wings utilizes power of the wind to pull a ship. This embodiment comprises a pair of wings 101, attached by cables 102 to an anti twist device 103. Anti twist device 103 is attached to a ship 110 by a tether (or another cable) 105. A control system 104 is provided. Ship 110 has a hull 106 and a rudder 107. Anti twist device 103 is provided in order to allow circular motion of wings 101. Anti twist device 103 comprises a top part 109 and a bottom part 108 with a ball bearing between them, allowing unlimited rotation of top part 109 relative to bottom part 108. Optionally, it can be provided with its own direction sensor (gyroscopic, magnetic or GPS) and a servomotor, compensating remaining twisting moment.

Wings 101 move cross wind in a circle in the same direction (clockwise or anti clockwise, when viewed from ship 110) under power of wind for long time. The circle lies in a plane—the plane of rotation. In FIG. 1, the plane of rotation is inclined about 45 degrees to the horizon. The aerodynamic forces (mostly aerodynamic lift) act on wings 101 and are transferred to anti twist device 103. There, force components, parallel to the plane of rotation, compensate each other. The remaining force component, normal to the plane of rotation, pulls tether 105, which pulls ship 110. The projection of tether 105 on horizontal plane does not usually match direction of the desired motion. Rudder 107 and hull 106 compensate sideways component of the pull force. Control system 104 selects direction of the tether to maximize the component of the pull force, matching the desired direction of ship motion (tractive component). Control system 104 can vary angle of attack of the wings depending on the wind condition and desired pull, and angle of inclination. Angle of inclination of the plane of rotation to the horizon can vary in wide range, from 30 to 85 degrees.

This system can be used either as an auxiliary propulsion system, as a main propulsion system with an auxiliary engine or, on a small boat, as a sole propulsion system. This system cannot pull ship 110 directly upwind. If upwind motion is desired, the system should be either depowered (wings are let to move with a minimum lift, required to keep wings 101 in the air) and a conventional engine used, or the ship should be tacking.

More than two wings can move in the same plane of rotation. Multiple anti twist devices 103 can be connected with long tethers on top of each other, with a system of wings connected to each anti twist device 103 and moving in parallel planes.

Lateral axis of wings 101 have slight inclination to the plane of rotation. Wings 101 are cambered. In one particular embodiment, the lateral axis of the wings 101 are inclined 10° to the plane of their rotation, and the angle of attack is 3°. The angles change, depending on strength of the wind and the required force. In another example, longitudinal axis of each wing 101 has constant angle 5° to the plane of rotation, and angle of attack changes with the position of the wing in the circle.

The system of wings 101 plays role of a conventional sail, with a big advantage: fast crosswind motion of the wings allows to develop force, many (possibly hundreds times) bigger than wind pressure on static sails of the same size. Another advantage is that it can catch stronger and more regular wings at the altitude above the sea level. Further, tether 105 does not exhibit significant motion and does not create significant drag. Also, circular motion of wings 101 requires lower centrifugal acceleration (compared with figure 8 motion).

Wing 101 can be any of the following: a rigid wing, like planes, gliders or ground based wind turbines have; a flexible wing; a soft wing; an inflatable wing; an inflatable wing, inflated by the ram air, entering it through holes; a kite wing; a paraglider wing; a wing, using soft materials, spread over a rigid frame or cables; a wing made of elastic fabric, receiving airfoil form from relative air flow; and/or a mixed wing, using different construction techniques in different parts of the wing.

Figure 2:
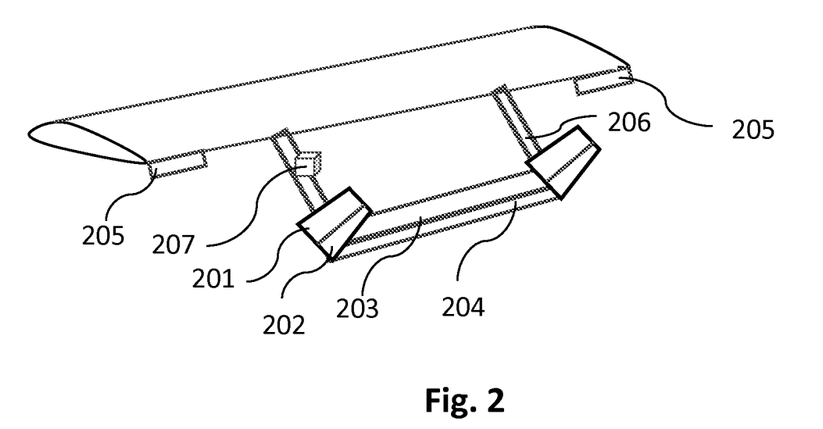
FIG. 2 is a schematic view of a rigid wing when used in the dynamic sail
Figure 3:
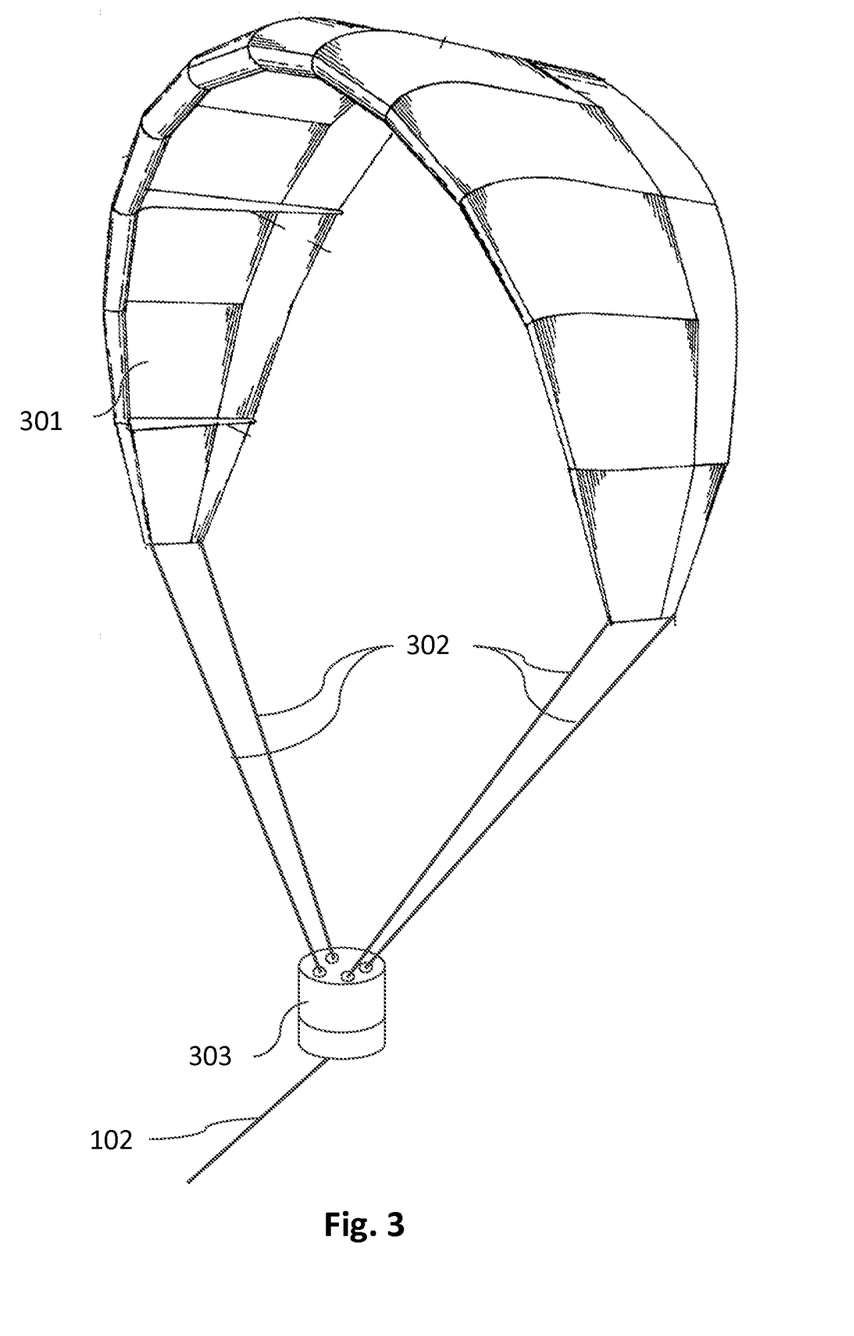
FIG. 3 is a schematic view of a flexible wing when used in the dynamic sail

Wing 101 can be made of various materials, including carbon fiber, fiberglass, wood, aluminum, aramids, para-aramids, polyester, high molecular weight polyethylene, nylon and others. Wing 101 may have wingtips to decrease turbulence and noise. Wing 101 has stabilization and control surfaces and their actuators and possibly its own control system. An example of a rigid wing is shown in FIG. 2. It comprises horizontal stabilizers 201, rudders 202, a vertical stabilizer 203 and an elevator 204 on a double boom 206, spoilers 205 and a control system 207. An example of a kite wing is shown in FIG. 3. It comprises flexible inflatable canopy 301, 4 combined control and suspension cables 302 and a control device 303. In this form, position of the wing relative to the wind and to the horizon is controlled by dynamically changing the lengths of cables 302. Wing 101 can be aerodynamically unstable and its stability can be assured by frequent application of corrective forces.

Control system 104 comprises a central processor or a microcontroller, actuators, sensors and communication means for communicating with the control elements of wings 101. Preferable communication means is a wireless network, although optical or copper wires, going through cables 102 and tether 105 can be used too. The sensors may include an anemometer, barometer, radar, hygrometer, thermometer, GPS, cable tension meter, RPM meter, cameras for observing the wings and other.

Figure 4:
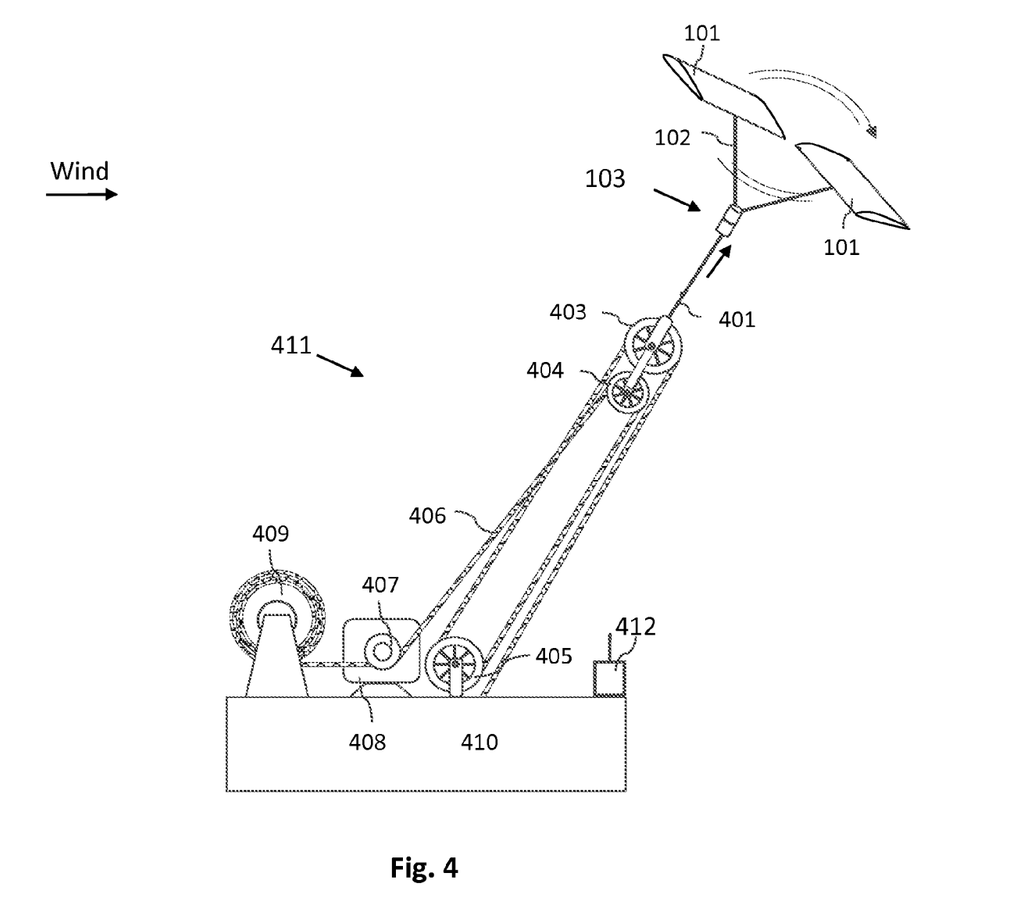
FIG. 4 is a schematic view of a wind energy conversion system according to one aspect of the present invention

FIG. 4 shows another embodiment of the invention. A pair of wings 101 connected by cables 102 to anti twist device 103 are is placed in the air and are flying cross wind with a speed, exceeding speed of the wind. Wings 101 can have a high L/D ratio, and move with speed is 4-20 times higher, than the speed of the wind. A cable 401 is attached to anti twist device 103 at one end and to a sheave 403 at another end. A ground platform 410 is installed on the ground, or slightly above the ground. An electric generator 408, having a rotor and a stator, is installed on the platform. A pulley 407 is rotationally connected to the rotor of electric generator 408. The connection can be via a gearbox, or pulley can be co-axial with the rotor, or another way of mechanical transmission can be utilized. Platform 410 can be able to rotate in horizontal plane (yaw) to order accommodate changes in direction of wind and movement of the wing. A sheave 405 is installed on platform 410. A belt 406 is attached by its one end to platform 410, goes around another sheave 403, then around sheave 405, then around one more sheave 404, and comes into contact with pulley 407. Belt 406 wraps around pulley 407 at a number of times, necessary to avoid slippage (this number can be between 0.25 and 20, depending on used materials, cable form and other conditions). Remaining part of cable 406 is wound around a spool 409.

Usual mechanical cables, ropes and lines of many forms and materials can be used for belt 406. Also, various belts, including perforated belts, flat belts, round belts, toothed belts, ribbed belts, grooved belts, V-belts and other can be used for belt 406. Control system 412 is provided.

Operation of this embodiment is controlled by control system 412. Operation comprises two phases: the active phase and the passive phase. The active phase starts when anti twist device 103 is in a position, closest to platform 410, sheave 403 is closest to sheave 405, and almost all of cable 406 is wound on spool 409. In a coordinate system, moving with anti twist device 103, wings 101 move in the rotation plane. Relative to platform 410, wings 101 move in ascending downwind spiral with constant radius, getting away from the platform. Aerodynamic lift of wings 101 pulls cable 401, which pulls sheave 403. Belt 406 is pulled up, unwinding from spool 409 and rotating pulley 407, which rotates the rotor of electrical generator 408, which produces electric energy. When all cable 406 is unwound from spool 409, an electric motor or some other means stop spool 409 and start rotating it in the opposite direction, winding cable 406 back on. Winding cable 406 pulls in sheave 403 and extension cable 102. Wings 101 stop flying cross wind and are commanded by control system 412 to fly in general direction of platform 410, creating minimum resistance, only to keep cables 102 and 103 stretched. In the end of passive phase, the device returns into the initial position, and a new active phase starts. The passive phase is much shorter than active phase and consumes very little energy.

Optional block and tackle 411 is employed to mechanical disadvantage. It is used here for two purposes:
a) increase velocity of belt 406 in contact with the pulley, thus decreasing forces, acting on the pulley and other mechanisms, connected to it, for the same power;
b) decrease tension of belt 406, thus allowing to decrease its thickness and, consequently, diameter of pulley 407, while increasing durability of the belt.

Increasing velocity of cable in contact with pulley 407 and decreasing diameter of pulley 407 allow to increase angular speed of pulley's rotation. A gearbox may still be required, but less expensive one than without use of block and tackle 411. FIG. 4 shows block and tackle system with mechanical disadvantage ratio of 4 (i.e., velocity of the cable near the pulley, attached to the rotor, is 4× higher than the speed, with which distance between wing 101 and generator 408 increases). By changing number of the sheaves, it is possible to change mechanical disadvantage ratio from 2 to 20. Block and tackle system 411 or its analogies (a differential pulley, Z-drag line, Spanish bartons etc.) can be used in any wind energy conversion system with airborne blades, where the motion transfer is performed by a cable. Alternatively, belt 406 can be connected directly to cable 401. If belt 406 is perforated, a matching sprocket can be used instead of pulley 407.

An example system with cross wind wing trajectory, in which anti twist device 103 is moving away from platform 410 with an average speed 2 m/s, pulley 407 has diameter 0.25 m and block and tackle provides 10× mechanical disadvantage has 1,500 RPM on pulley, sufficient for almost every 50 Hz electric generator without gearbox.

It should be noted, that in the active phase cable 401 moves steadily in the direction of its length and neither it nor block and tackle system 411 experience significant sideways motion (thus saving power losses due to air resistance and excessive wear of cable 406). Different strategies for control of wings 101 can be utilized by control system 412 in the active phase. One strategy is to attempt to keep wing's angle of attack in the air constant and low. Another strategy is to attempt to keep constant the wing's angle to the wings' plane of rotation. These controls actions can be combined with cyclical changing angle of the lateral axis of the wings to their plane of rotation (over each 360 degrees rotation cycle). Anti twist device 103 prevents twisting of cable 401.

Figure 5:
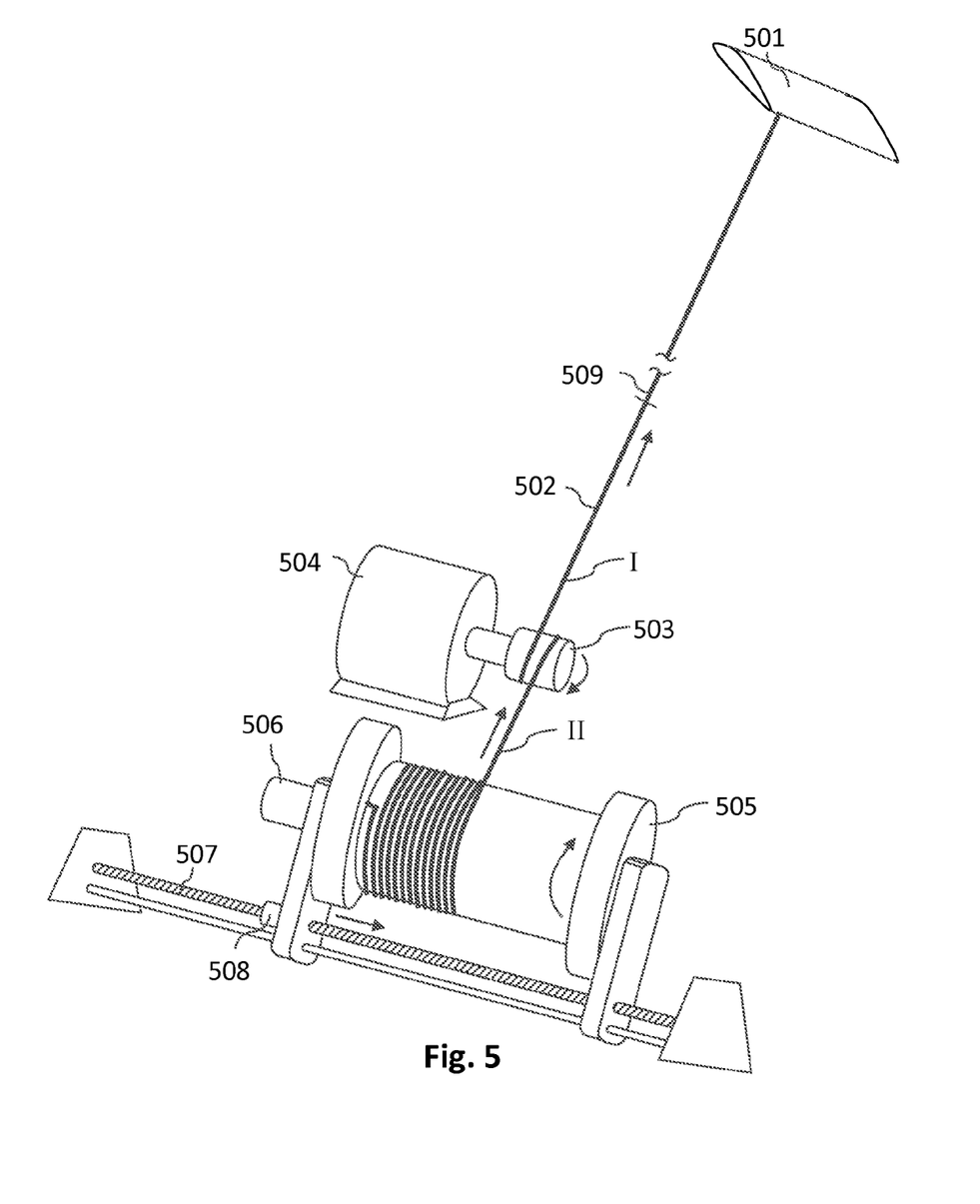
FIG. 5 is a perspective view of a wind energy conversion system with a separate pulley or sprocket and a cable drum

FIG. 5 shows another aspect of the invention—an enhanced mechanism for conversion of linear motion of a cable into rotational motion of a rotor of electric generator. In one embodiment, this aspect of the invention comprises at least one wing 501, moving in the air under power of wind and pulling a cable 502. On the ground, there is an electric generator 504, comprising a rotor and a stator. A pulley (or a sheave, or a sprocket for a perforated belt) 503 is rotationally attached to the rotor of generator 504. Optionally, it can be attached through a gearbox (not shown on the picture). Cable 502 is wrapped around pulley 503 at least pre-defined number of turns. Pre-defined number of turns can be fractional and is usually small, typically between 0.5 and 20. After wrapping around pulley 503, cable 502 is wound around a spool 505, and cable's end is attached to it. Means are provided to wind and unwind cable 502 accurately and to maintain pre-defined force on cable 503 in direction from pulley 503 to spool 505 in order to ensure sufficient friction. In FIG. 5, these means are a small electrical motor 506, attached to spool 505, and a ball screw 507 with associated small electric motor 508. Further, an optional section of cable 509 of a different kind can be inserted between wing 501 and cable 502. For example, cable 509 can be a standard round cable, while cable 502 can be a perforated belt. If cable 502 is perforated belt, a sprocket is used instead of pulley 503.

Operation of the system consists of two phases—the active phase and the passive phase. In the active phase, wing 501 is moving away from pulley 503, while rotating the rotor of generator 504, which generates electricity. It should be noted, that trajectories of the wing may differ as long as the cable length between wing 501 and pulley 503 increases. In the passive phase, wing 501 moves toward pulley 503, while cable 502 is winding on spool 505. Electrical energy is not generated in the passive phase, other way around—small amount of electrical energy may be consumed. The arrows on the picture show direction of movement of cable 502, spool 505 and direction of rotation of pulley 503 and spool 505 in the active phase. In the passive phase these directions are opposite.

In the beginning of the active phase, spool 505 is in its left most position, wing 501 is in the position, closest to pulley 503 and most of cable 502 is wound on spool 505. In the active phase wing 501 is moving away, pulling cable 502. Cable 502 rotates pulley 503 and unwinds from spool 505. Small motor 506 resists rotation of spool 505, creating a force on the segment II of cable 502, opposite to direction of cable movement. Force, acting on segment II, is much smaller than force of wing's pull, acting on segment I, so that cable unwinds, while rotating pulley 503 without slippage. As cable 502 unwinds from spool 505, spool 505 moves toward right on ball screw 507, pushed by motor 508. Spool 505 moves to right with such speed that unwinding cable remains aligned with pulley 503. In the end of active phase, spool 505 is in its right most position, wing 501 is in the furthest position from pulley 503 and only few wraps of cable 502 remain on spool 505. Then passive phase starts. In this phase, motor 506 rotates pulley 506 in the opposite direction, winding cable 502 on pulley 505, while motor 508 moves spool 505 to the left. In the end of the passive phase, positions of the parts of the system correspond to the positions in the beginning of the active phase.

The benefits of this embodiment are due to the fact, that forces, acting on segment II of cable 502 are much smaller than forces, acting on segment I of cable 502. The ratio is determined by belt friction equation:

$$T_{load} = T_{hold} e^{\mu \phi}$$

where $T_{load}$ the force on segment I, $T_{hold}$ is the force on segment II, mu is the coefficient of friction and phi is the angle of cable wrapping. It is desirable to have higher ratio of forces. In many cases ratio 20:1 is sufficient (i.e., force on segment II is 5% of force on segment I). To achieve such ratio with a high friction ribbed belt over ribbed sheave (mu=0.9), only half turn of the cable is required. To achieve such ratio with Dyneema over smooth steel (mu=0.05), full 20 turns are required. In any case, the force should be sufficient to prevent slippage. Since force, acting on segment II of cable 502 is relatively small and we do not care about angular velocity of spool 505, spool 505 can be wide and long and cable 502 can be laid in multiple layers on it.

Among advantages of this aspect and embodiment: very long cables and very long cable motion are allowed (up to tens of kilometers) due to large capacity of spool 505; cables and belts, withstanding high tension are allowed due to large capacity of spool 505; cable fatigue is decreased due to large diameter of spool 505; flat cables and belts can be used; rotational velocity of pulley 503 can be increased for the same linear velocity of cable 502 by decreasing diameter of pulley 503; higher power output at lower cost is achieved.

As a variation of this embodiment, a second wing can be used instead of spool 505, creating resistance in segment II of cable 502 in its active phase, and pulling cable 502 in the passive phase of the first wing. Also, drag based wind capturing devices can be used instead of wings in this embodiment.

Another aspect of the invention is a streamlined cable and method of its manufacturing, combining high strength with low drag in cross flow and low disturbance of laminar air flow. The high drag of a usual cable is caused by it being round in section. This causes disturbance of air flow in the area behind the cable. Thus, aerodynamic cable should have a section in the form of a streamlined body.

Figure 6A:
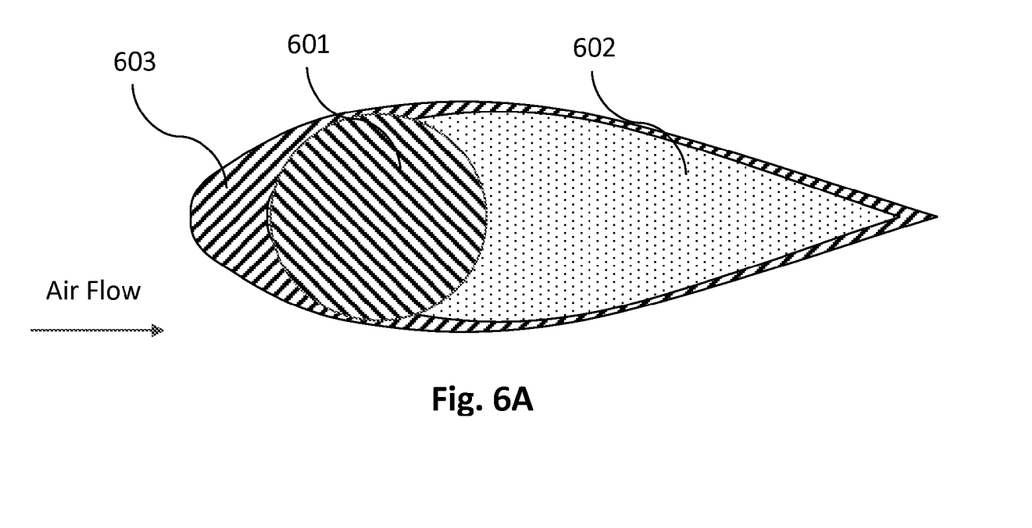
FIG. 6A is a sectional view of one form of a aerodynamically streamlined cable

FIG. 6A shows one embodiment of such aerodynamic cable in section. It consists of an off-the-shelf load bearing rope 601 inside of a streamlined jacket or coating 603, with the remaining space occupied by polyethylene foam 602. Rope 601 is placed in the widest place inside jacket 603 (or jacket 603 is wrapped around rope 601). In some variants of this embodiments, especially when the rope diameter is small, polyethylene foam 602 is replaced by air. Also, electrical or optical wires can pass in the space between core 601 and jacket 603. Other light weight flexible material can be used instead of polyethylene foam. Rope 601 is made of aramid (including poly aramid or meta aramid) fibers, ultra high molecular weight polyethylene fibers, carbon fibers or another strong material. Jacket 603 is made of nylon or other material, sufficiently durable and flexible. Material of jacket 603 should also be smooth from outside, resistant to water and ultra violet radiation, or have coating with these properties. When the aerodynamic cable is attached to another cable or surface, jacket 603 and foam 602 are removed at the end, and rope 601 is attached as usual.

Figure 6B:
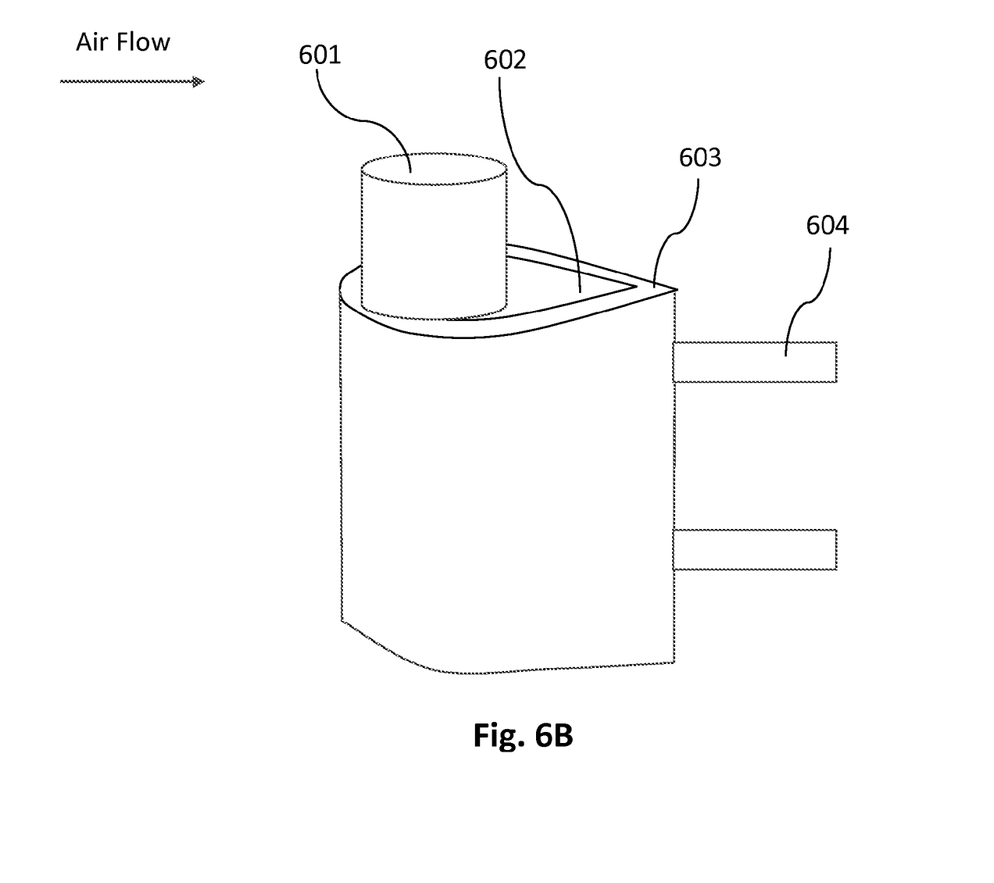
FIG. 6B is a perspective view of one form of the aerodynamically streamlined cable

FIG. 6B shows perspective view of the aerodynamic cable according to this embodiment, with rope 601 exposed at the end. In most cases, the cable needs to orient itself correctly in the air stream. The cable in this embodiment does orient itself in the air stream, when it is attached by its end and sufficiently long. In some variations, additional strips 604 are attached to the rear end of the cable at constant intervals, to provide additional stabilization in the air flow. Strips 604 can be rigid or flexible.

Figure 7:
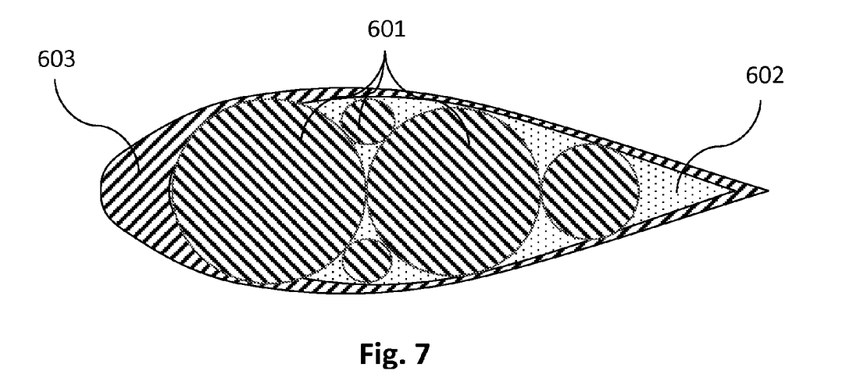
FIG. 7 is a sectional view of another form of the aerodynamically streamlined cable
Figure 8:
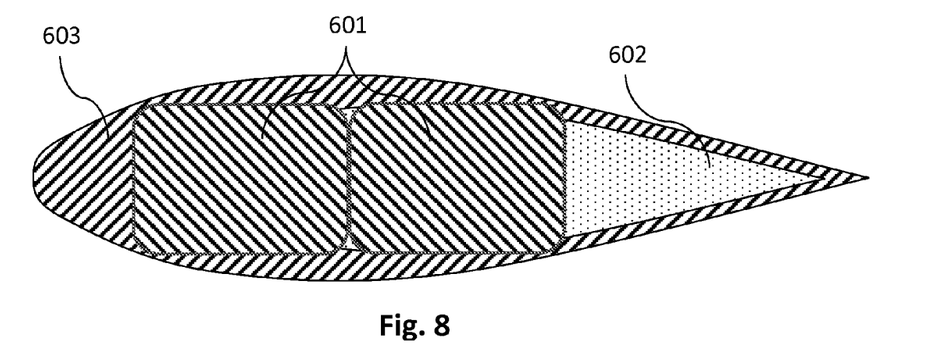
FIG. 8 is a sectional view of one more form of the aerodynamically streamlined cable
Figure 9:
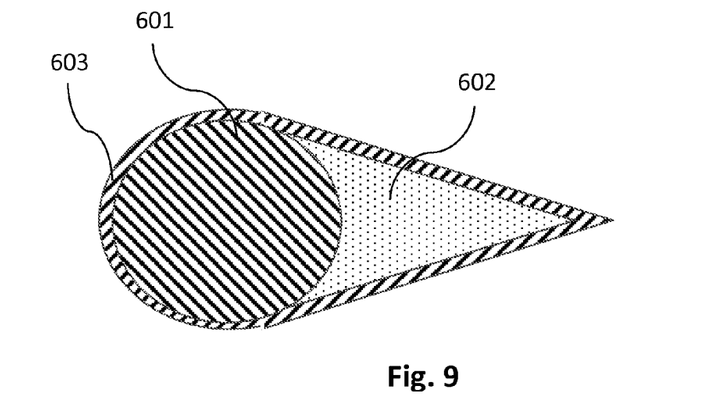
FIG. 9 is a sectional view of yet another form of the aerodynamically streamlined cable
Figure 10:
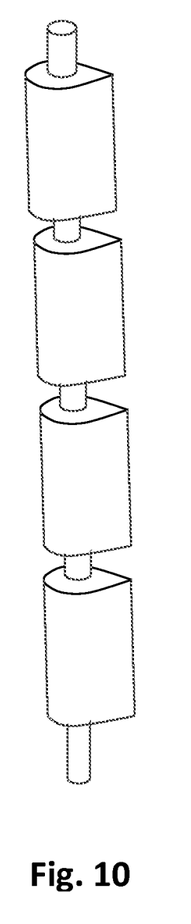
FIG. 10 is a perspective view of another form of the aerodynamically streamlined cable

FIG. 7 shows another embodiment of the aerodynamic cable in section. It comprises multiple ropes 601, possibly of different diameters. In this embodiment, ropes or yarns 601 can fill part or whole space inside of jacket 603. FIG. 8 shows another embodiment of such aerodynamic cable in section. It uses one or more sideways compressed ropes 601. As the result of asymmetrical compression, rope 601 should be wider in the direction of the airfoil axis and narrower in the perpendicular direction. FIG. 9 shows another embodiment of such streamlined cable, in which sectional form is not airfoil, but round in the forward part and angular in the rear part. FIG. 10 shows another embodiment, in which a small section of jacket 603 is removed at equal intervals (for example, each one hundred diameters of rope 601). It is done for better flexibility and self orientation in the air flow.

These embodiments of invention will have aerodynamic drag many times (5x-50x) lower, than round cable of the same strength and weight, due to lower form drag coefficient in all embodiments and lower cross section in some embodiments for the same strength. The applications of the streamlined cable are in the airborne wind energy conversion devices, tethered aircraft, suspension cables for airplanes and kites, guy wires for tall buildings, bridge suspensions etc. Jacket 603 may have dimples to damp oscillations. The streamlined cable can be manufactured from conventional round fiber rope by flattening it by pressure from the sides, using the flattened rope 601 as the force bearing core, and then wrapping jacket 603 around it, with optional foam 602 inside of jacket 603.

Examples of using streamlined cable in this invention are for cables 102 in FIG. 1 and FIG. 4, cable 509 in FIG. 5, suspension cables in the kite wing in FIG. 3.

Multiple embodiments and aspects of the invention are described with reference to ground level. The invention can be practiced in marine environment (oceans, seas, lakes as well), in which case water level replaces ground level.

Thus, a wind power system with a dynamic sail, streamlined cable or enhanced ground mechanisms is described in conjunction with multiple specific embodiments. While the above description contains many specificities, these should not be construed as limitations on the scope, but rather as exemplification of several embodiments thereof. Many other variations are possible.

What is claimed is:

1. A device for conversion of wind energy into electric energy, comprising:
   an airborne wing or sail, moving under power of wind;
   a ground level platform;
   a rotational element attached to said platform;
   a first sheave installed on said platform;
   a second sheave;
   a third sheave coupled to the second sheave;
   a round or streamlined cable having one end attached to said wing or sail and another end of said cable attached to said second sheave;
   a flat or flattened belt having one end attached to said platform, wherein said belt goes around said second sheave, then around said first sheave, and then around said third sheave and comes in contact with said rotational element;
   an electrical generator having a rotor rotationally connected to said rotational element;
   a drum for holding a remaining end of said belt.

2. The device of claim 1, wherein the wing or sail comprises an anti-twist device and the cable is attached to the anti-twist device.

3. The device of claim 1, wherein said belt is a perforated belt and said rotational element is a sprocket.

4. The device of claim 3, wherein the sprocket has smaller diameter than the drum, thus achieving higher angular speed of the sprocket.

5. The device of claim 3, further comprising a motor, rotationally coupled to the drum and adapted to reel said belt on the drum.

6. The device of claim 1, wherein a pulley is used as said rotational element.

7. The device of claim 6, wherein the belt is ribbed.

8. A method of converting linear motion of a cable into rotational motion in a wind energy conversion device, comprising steps:
   providing an airborne wing;
   providing a ground level platform;
   providing a rotational element coupled with a rotor of an electric generator;
   providing a first sheave installed on said platform;
   providing a second sheave;
   providing a third sheave coupled to the second sheave;
   providing a rounded or streamlined cable having one end coupled to the airborne wing and another end of said cable attached to said second sheave;
   providing a flat or flattened belt having one end attached to said platform, wherein said belt goes around said second sheave, then around said first sheave, and then around said third sheave and comes in contact with said rotational element;
   converting linear motion of said belt into rotation of said rotational element without slippage, wherein the rotation of said rotational element rotates said rotor of said electric generator to produce electric energy;
   storing a remaining end of said belt separately from said rotational element.

9. The method of claim 8, further comprising the step of utilizing an electronic control system to control the electrical generator and the rotational element.

10. The method of claim 8, wherein said rotational element is a pulley or a sprocket and the excess of said belt is stored on a drum.

11. The method of claim 10, wherein the drum experiences significantly lower forces from said cable than the pulley or sprocket.

12. The method of claim 10, wherein said belt rotates the pulley or sprocket as it unwinds off the drum.

13. The method of claim 10, further comprising the step of utilizing an electronic control system to synchronize reel on/reel off of said belt with the motion of the airborne wing.

14. A moving sail for use in systems, utilizing wind power, comprising:
   at least two separated airborne wings;
   a platform at a ground level;
   a pulled element attached to the platform;
   a tether attached to said pulled element;
   an anti-twist device preventing twisting of the tether by motion of the wings;
   the anti-twist device has a first side and a second side, each of said wings is attached to said first side of said anti-twist device by at least one cable and said tether is attached to said second side of said anti-twist device;
   wherein said anti-twist device allowed unlimited rotation of said first side relative to said second side;
   wherein said wings move under influence of the wind in the same clockwise or counter clockwise direction, if viewed from said platform, and the motion of said wings has substantial cross wind component.

* * * * *